Sept. 18, 1956      J. A. HARDY      2,763,055
METHOD OF ASSEMBLING RUBBER BUSHINGS
Filed March 26, 1951      2 Sheets-Sheet 1
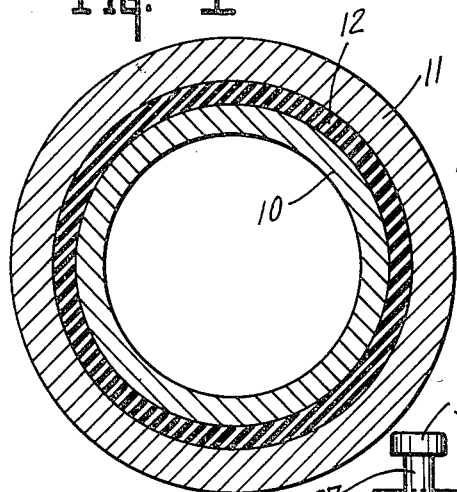
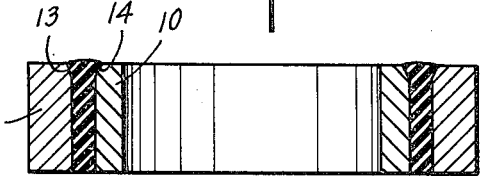
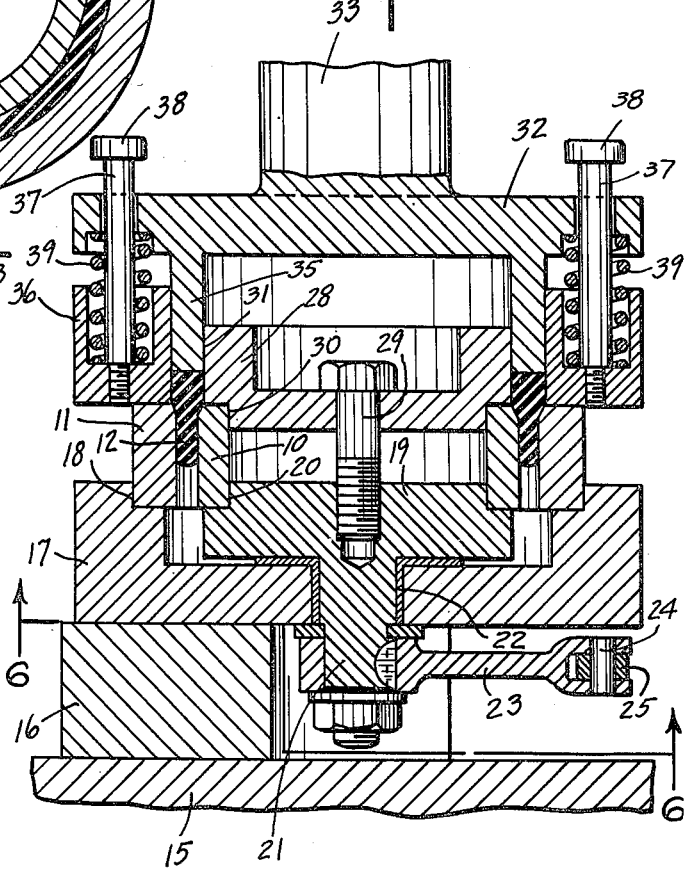
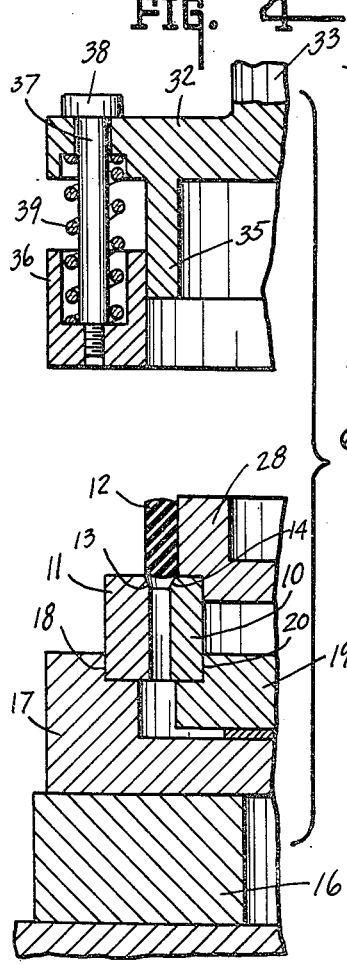
INVENTOR.
JAMES A. HARDY.
BY
Lockwood, Hahn, Galt & Woodard,
ATTORNEYS.

Sept. 18, 1956 J. A. HARDY 2,763,055
METHOD OF ASSEMBLING RUBBER BUSHINGS
Filed March 26, 1951 2 Sheets-Sheet 2

INVENTOR.
JAMES A. HARDY.
BY
Lockwood, Hahn, Galt & Woodard.
ATTORNEYS.

United States Patent Office 2,763,055
Patented Sept. 18, 1956

---

2,763,055

METHOD OF ASSEMBLING RUBBER BUSHINGS

James A. Hardy, Indianapolis, Ind., assignor to Schwitzer Corporation, Indianapolis, Ind., a corporation Application March 26, 1951, Serial No. 217,561

1 Claim. (Cl. 29—450)

This invention relates to a method of assembling bushings made of rubber or similar materials in a compressed state between two cylindrical surfaces, insuring that the cylindrical surfaces will remain essentially parallel and concentric after assembly.

This is accomplished in the manner hereinafter more specifically set forth and described by mounting the spaced concentric rings or sleeves between which the bushing is to be placed, in a fixture, applying lubricant to the surfaces thereof, and thereupon simultaneously exerting axial force against the bushing to force it between the sleeves or rings while oscillating one of the sleeves or rings relative to the other. Such simultaneous force and oscillation causes a slippage between the elastic bushing and the confining surfaces of the sleeves or rings. Such slippage permits the bushing to set into place and relieves stresses therein such as would otherwise cause the sleeves or rings to be eccentric with respect to each other after completion of the assembly.

It further results in an even flow of the elastic body of the bushing such that its compression and tension is evenly distributed throughout, free of localized stress or strain.

The full nature of the invention will be understood from the accompanying drawings and the following description and claim.

Fig. 1 is an end view showing a pair of spaced concentric sleeves with an elastic bushing assembled therebetween.

Fig. 2 is a central vertical section through the assembly shown in Fig. 1.

Fig. 3 is a central vertical section through the apparatus employed in practicing the method of inserting an elastic bushing between spaced concentric rings with the bushing partially inserted.

Fig. 4 is a view similar to Fig. 3 with portions thereof broken away, illustrative of the position of the parts at the beginning of the assembly operation.

Figure 5:
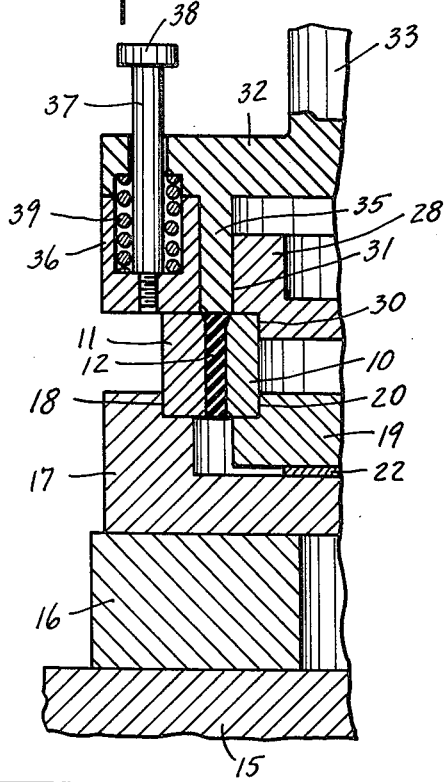
Fig. 5 is the same as Fig. 4 showing the position of the parts at the completion of the assembly operation.

In the drawings there is shown for illustration an inner sleeve or ring 10 and an outer sleeve or ring 11 spaced therefrom between which there is a compressed elastic bushing 12 of rubber or similar material. For facilitating assembly of the bushing between the sleeves under compression, one inner edge of the sleeve 12 is slightly chamfered at 13 and one outer edge of the sleeve 10 is chamfered as indicated at 14.

Figure 6:
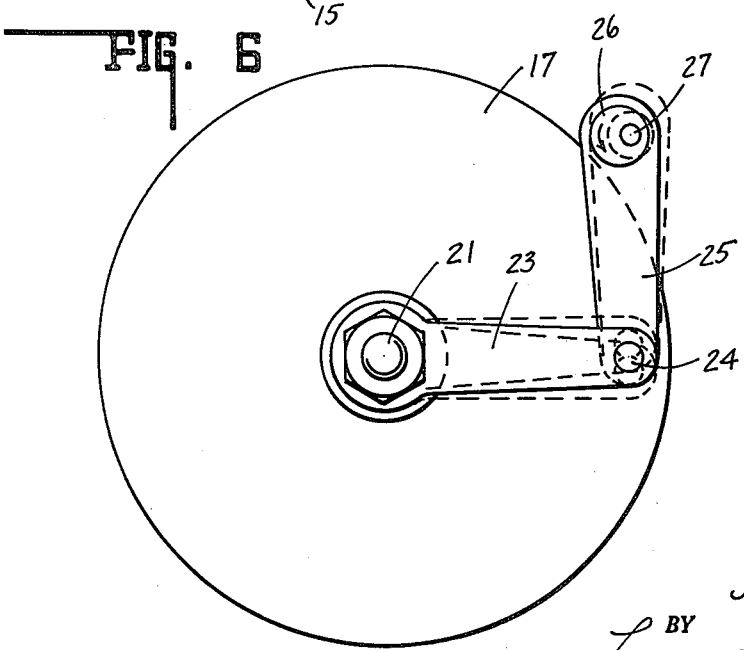
Fig. 6 is a plan view of the underside of the apparatus viewed from the line 6—6 of Fig. 3, showing the oscillating mechanism.

The apparatus employed in practicing the method is shown in Figs. 3 to 6, inclusive, and comprises essentially a punch press mounted on a suitable bolster plate 15 with a sub base 16 and a bed plate 17, all secured in fixed relation. The bed plate 17 is provided with an inner annular piloting recess 18 for seating and centering therein the outer sleeve 11. Rotatably mounted within the bed plate 17 there is an oscillatory fixture 19 provided with an annular piloting recess 20. The recess 20 seats and centers the inner sleeve 10 therein so that it is held in juxtaposition to the outer ring 11 to provide the desired predetermined space between the adjacent concentric surfaces thereof for the reception of the bushing.

The oscillating fixture 19 is formed with a downwardly extending boss 21 mounted for oscillation upon and within the bed plate 17 by the bearing 22. Secured to the lower end of the boss 21 there is an oscillating arm 23 pivotally connected at 24 to a crank arm 25. The crank arm 25 (Fig. 6) is actuated at its free end by a rotating eccentric 26 driven through the shaft 27 by any suitable means not shown.

Upon the inner sleeve 10 being mounted in its seat on the oscillating fixture 19, it is clamped in position thereon by a clamping head 28. Said clamping head is secured to the fixture 19 by a bolt 29 and is provided with an annular piloting recess 30 conforming to the upper end of the sleeve 10 for seating and clamping said sleeve in position on the oscillating fixture. The outer annular face of the clamping head as indicated at 31, is of the same diameter as the chamfered end of the inner sleeve 10, and is adapted to receive thereabout the bushing 12 in its free state, as shown in Fig. 4.

The upper part of the press comprises the upper head 32 terminating in a ram 33 and connected with any suitable source of power for reciprocation in the usual manner. The head 32 carries a depending annular punch ring 35 of substantially the same thickness as the uncompressed bushing 12, and to extend in alignment with the space chamfered edges 13, 14 of the seated rings 10, 11.

The upper head 32 of the press carries an annular clamping ring 36 mounted adjacent to, surrounding and have reciprocation relative to the punch ring 35. Said clamping ring is secured to an annular series of guide pins 37, each having a head 38 and surrounded by a compression spring 39 seating in opposed pockets formed respectively in the upper head 32 and the clamping ring 36. Said pins are slidable in the upper head and the ring is so arranged as to seat upon and clamp the outer sleeve 11 on the bed plate 17.

In operation, and as shown in Fig. 4, the method is practiced by raising the upper head of the press, seating the sleeves 10 and 11 on the oscillating fixture and bed plate respectively, lubricating the bushing 12, or inner surfaces of the sleeves, and mounting it about the clamping head 28. As the press is lowered, the depending clamping ring 36 slides over the bushing into clamping engagement with the outer sleeve 11 to clamp it in position to provide an annular channel through which the punch ring 35 moves. Continued lowering of the upper head compresses the springs 39 and applies an axial force against the upper edge of the bushing, forcing it downwardly between the sleeves 10 and 11, as shown in Fig. 3. As the exerted force is applied to the bushing, the oscillating fixture is caused to oscillate by the means shown in Fig. 6, and such concurrent axial force and oscillation is continued until the bushing is finally positioned between the sleeves under compression.

The combined and simultaneous application of force and rotative movement of one of the sleeves relative to the other causes slippage between the bushing and the confining surfaces of the sleeves, which permits the bushing to settle into place under compression and relieves stresses in the material that would otherwise cause the sleeves to become eccentric in respect to each other with their surfaces out of parallel upon their being removed from the assembly fixture.

The invention claimed is:

The method of assembling an annular elastic bushing in a compressed state between a pair of spaced annular and concentric sleeves with the outer surfaces of said bushing engaging the inner surfaces of said sleeves, consisting in applying a film of lubricant to one of a pair of engaging surfaces, aligning one end of the bushing with the space between said sleeves, applying force to said bushing axially thereof in a direction to force it between said sleeves, and simultaneously effecting a rotative oscillatory movement between one of said sleeves relative to the other said sleeve about their common axes.

References Cited in the file of this patent

UNITED STATES PATENTS

| | | |
|---|---|---|
| 1,830,814 | Thiry | Nov. 10, 1931 |
| 1,961,536 | Thiry | June 5, 1934 |
| 2,031,797 | Tarbox | Feb. 25, 1936 |
| 2,086,667 | Fletcher | July 13, 1937 |
| 2,300,435 | Ricciardi | Nov. 3, 1942 |
| 2,340,902 | Scully et al. | Feb. 8, 1944 |
| 2,347,780 | Hermanns | May 2, 1944 |
| 2,386,841 | Cooke | Oct. 16, 1945 |
| 2,446,621 | Thiry | Aug. 10, 1948 |
| 2,550,564 | Hutton | Apr. 24, 1951 |
| 2,551,652 | Vreeland | May 8, 1951 |
| 2,560,023 | Workman | July 10, 1951 |